United States Patent [19]
Nagin, Jr. et al.

[11] 3,874,718
[45] Apr. 1, 1975

[54] DECELERATING SAFETY BUMPER FOR VEHICLES AND THE LIKE

[76] Inventors: Tony Nagin, Jr.; Tony Nagin, Sr., both of 14016 S. Indiana, Riverdale, Ill. 60627

[22] Filed: Feb. 8, 1973

[21] Appl. No.: 330,616

[52] U.S. Cl............................ 293/85, 293/73, 180/91
[51] Int. Cl............................ B60r 19/06, 180 91;93
[58] Field of Search .......... 293/1, 60, 70, 71 R, 73, 293/85, 86, 89; 214/514

[56] References Cited
UNITED STATES PATENTS

| | | | |
|---|---|---|---|
| 1,622,442 | 3/1927 | Guenther et al. | 293/71 R |
| 2,966,225 | 12/1960 | Carroll | 180/93 |
| 3,021,024 | 2/1962 | Nagin | 214/514 |
| 3,718,356 | 2/1973 | Gabella | 180/91 |

*Primary Examiner*—M. Henson Wood, Jr.
*Assistant Examiner*—Robert Saifer
*Attorney, Agent, or Firm*—Hill, Gross, Simpson, Van Santen, Steadman, Chiara & Simpson

[57] ABSTRACT

A bumper structure for a vehicle or the like, having a relatively long extension and retraction travel whereby the bumper may be sufficiently extended when the vehicle is in motion to provide a relatively very large shock or impact absorption, the structure readily being capable of extension for example, of 20 inches or more, and capable of being designed to provide a progressive shock absorbing action of widely varying characteristics. The construction is such that relatively long extension and retraction may be achieved in a structure taking up relatively little if any greater longitudinal space than conventional bumper structures, and even less space than many of the "so-called" shock absorbing bumpers not being introduced, which results are accomplished by the use of chain structures which are rigid in compression but which may be passed around cooperable sprockets whereby unextended portions of the chains may extend transversely to the longitudinal axis of the vehicle.

33 Claims, 14 Drawing Figures

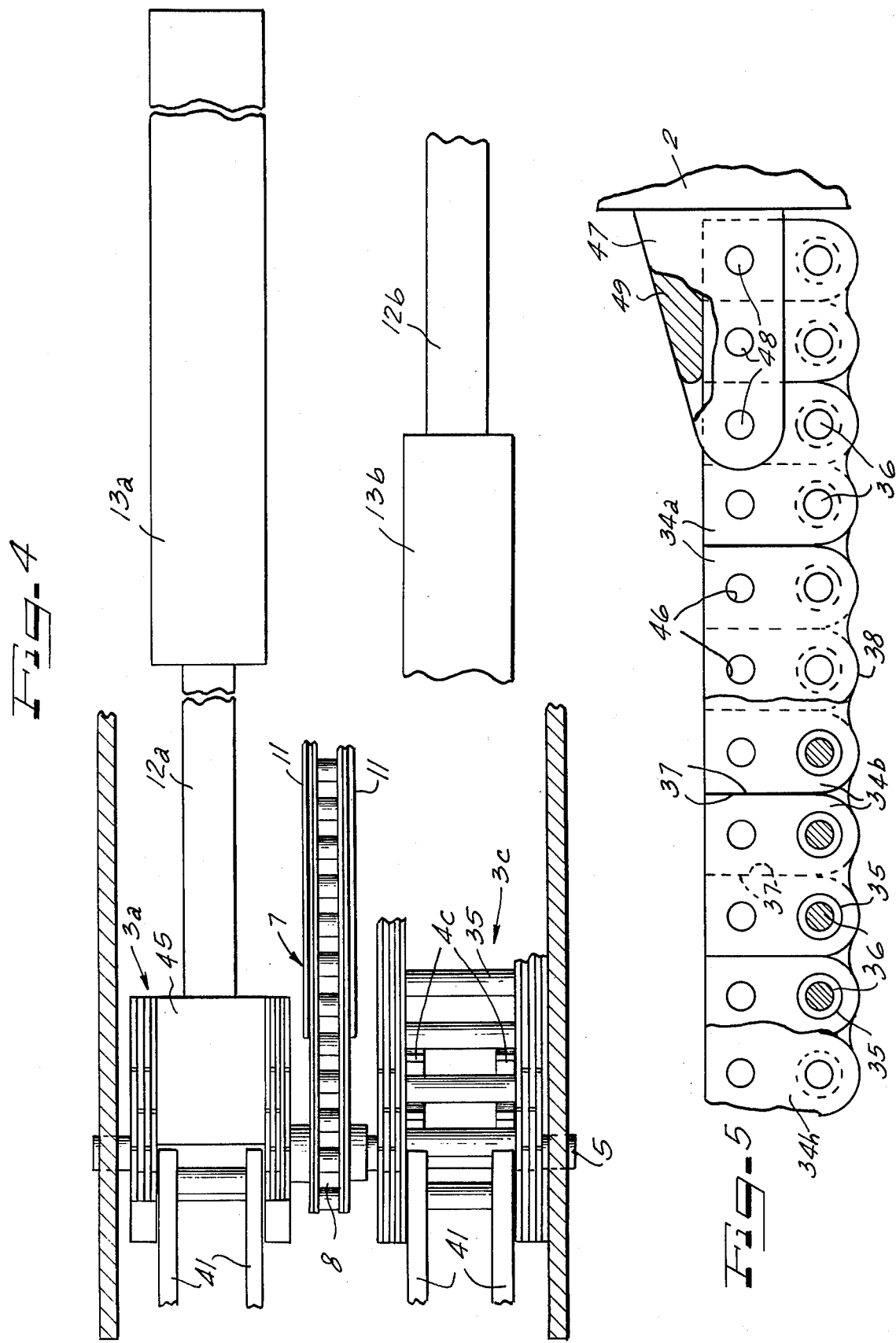

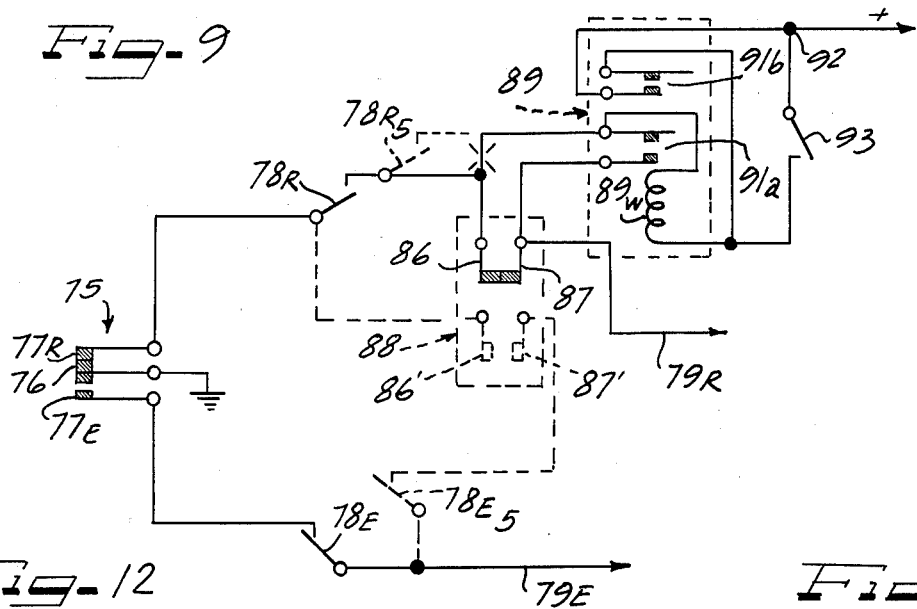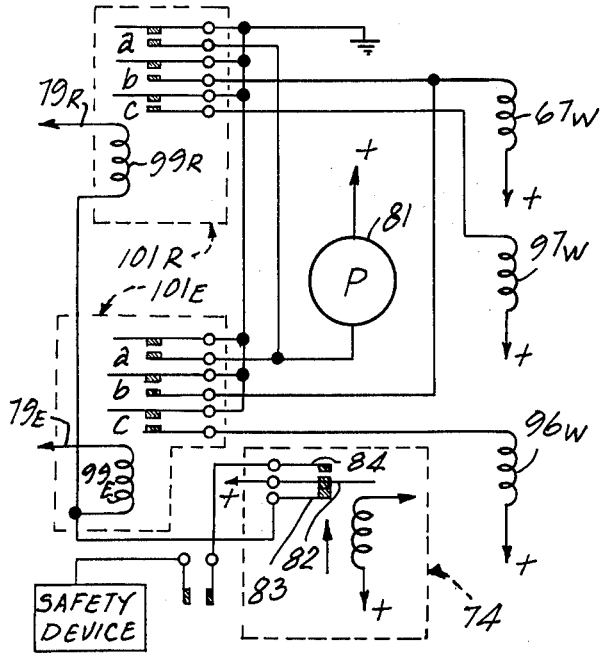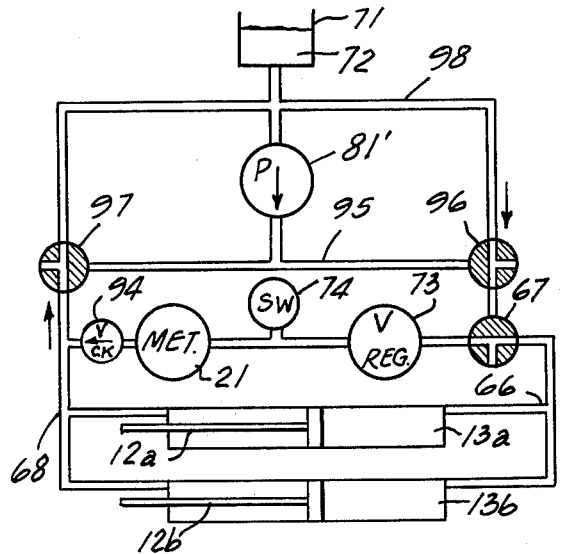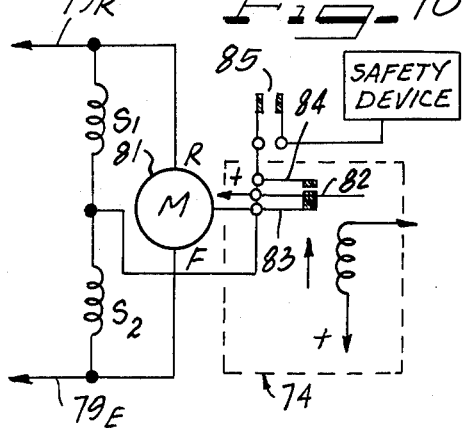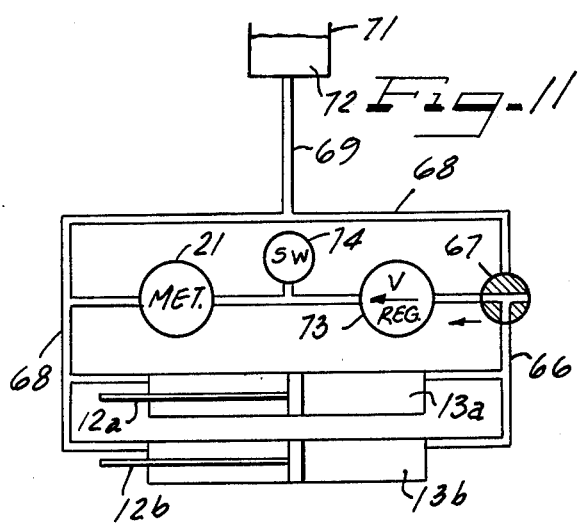

DECELERATING SAFETY BUMPER FOR VEHICLES AND THE LIKE

The present invention also provides a novel means for controlling the shock absorbing action of the structure as well as novel means which may be electrical or hydraulic, for extending and retracting the bumper structure when desired.

BACKGROUND OF THE INVENTION

With greater and greater emphasis being placed on automotive safety, and in particular, requirements with respect to bumper structures capable of absorbing impacts, for example, at 5 miles per hour or more, without damage to the bumper of vehicle structure, a need arises, not only for a bumper structure capable of withstanding the impact loads mentioned, but also one which is compact, relatively simple in construction and preferably capable of being so designed that considerably greater impact loads can be accommodated than those presently specified with respect to current motor cars and the like.

It will be appreciated that accommodation of greater impact loads primarily involves an increase in bumper travel, together with suitable control of the shock absorbing mechanism, for example, hydraulic cylinders, to provide a suitable desired control of the shock absorbing action, for example a progressive non-linear action.

It will also be appreciated that the provision of increased and relatively long bumper travel correspondingly progressively increases the front to rear dimensions of the bumper and shock absorbing structures, of standard type utilizing hydraulic cylinders which have an operative travel in such front to rear directions.

BRIEF SUMMARY OF THE INVENTION

The present invention is directed to a bumper or impact structure having relatively very small or short front to rear overall dimensions when in a retracted position but simultaneously providing a relatively very long travel with respect to its extended position. This is accomplished by the utilization of a plurality of chain structures, the general construction of which is known, in which the extended chain is rigid with respect to longitudinal compression forces acting thereon but readily capable of being passed around a supporting sprocket. Thus the extensible members may be constructed of such chain and passed over respective sprockets whereby unextended portions of the chain may extend transversely to the direction of extension and retraction so that the total extended length bears no direct relation to the overall retracted length of the structure. The respective chains are suitably connected to cooperable hydraulic shock absorbing means whereby compression forces on the chains are transmitted to such shock absorbing means when the bumper structure is subjected to impact compression loads.

In accordance with the invention the shock absorbing means is so constructed that a predetermined control of the shock absorbing action may be achieved, which control, for example, may be so effected as to produce substantially any desired shock absorbing curve, i.e., the shock absorbing resistance may be varied in dependence upon travel of the shock absorbing means.

In accordance with another feature of the invention, provision is made for selectively extending or retracting the bumper structure in dependence upon the speed or condition of the vehicle, whereby, for example, maximum extension of the structure may be achieved when the vehicle reaches a predetermined speed and subsequently retracted to a desired position under predetermined vehicle conditions. In accordance with other features of the invention, such extension and retraction may be effected electrically or hydraulically.

In accordance with another feature of the invention, the structure may be arranged to apply forces to both the cylinder and piston of the cooperable shock absorbing means.

Likewise, the links of the chain structure and the mounting structure therefor at the bumper member may be so constructed that some of the impact compression forces on the bumper member are applied to the chain in a direction urging the chain links in their compression-transmitting positions to insure the desired operation.

BRIEF DESCRIPTION OF THE DRAWINGS

In the drawings wherein like reference characters indicate like or corresponding parts:

FIG. 4 is a rear elevation of a portion of the structure illustrated in FIG. 3;

FIG. 5 is a plan view of the outer end portion of a chain member and cooperable structure for connecting it to the bumper member;

FIG. 9 is a schematic circuit of an electrical arrangement for use in controlling the extension and retraction of the bumper structure responsive to the speed or condition of the vehicle on which it is mounted;

FIG. 10 is a circuit diagram cooperable with the circuit of FIG. 9, in which extension and retraction is effected by an electrical motor;

FIG. 11 is a flow diagram of the hydraulic circuitry employed with the control circuit of FIG. 10;

FIG. 12 is a schematic circuit diagram for cooperation with the circuit of FIG. 9 in a bumper construction utilizing hydraulic means for extension and retraction of the bumper in response to the vehicle speed or condition;

FIG. 13 is a flow diagram of the hydraulic circuit associated with the electrical circuit of FIG. 12.

DETAILED DESCRIPTION OF THE INVENTION.

Figure 1:
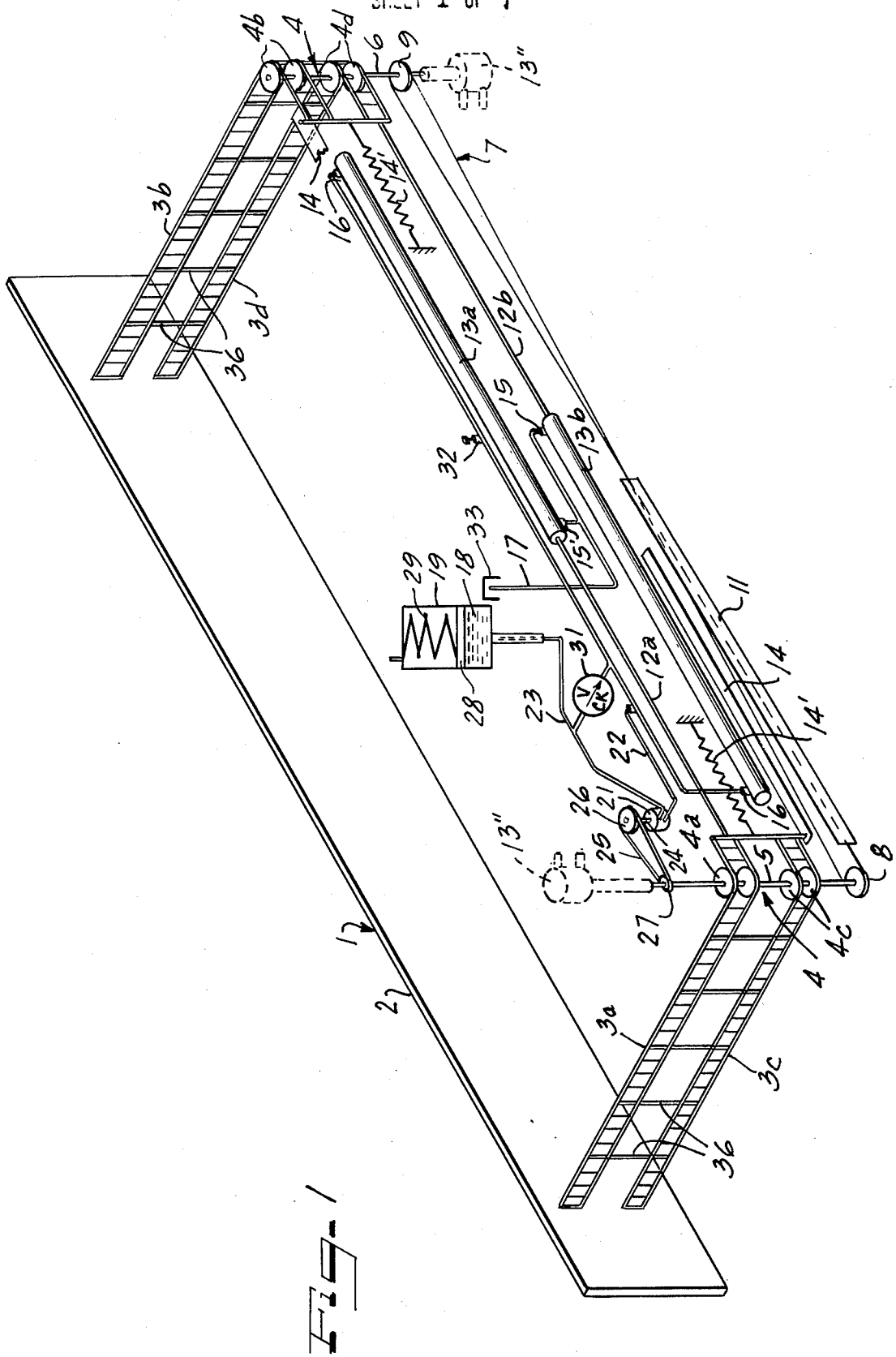
FIG. 1 is a semi-diagrammatic perspective view of an impact absorbing structure, for example, a vehicle bumper, illustrating the general construction thereof.

The invention will be initially considered in general in connection with the subject matter of FIG. 1 which diagrammatically illustrates a shock absorbing bumper structure or the like embodying the principles of the invention, in which the structure is adapted to be constantly maintained in a fully extended position.

Figure 2:
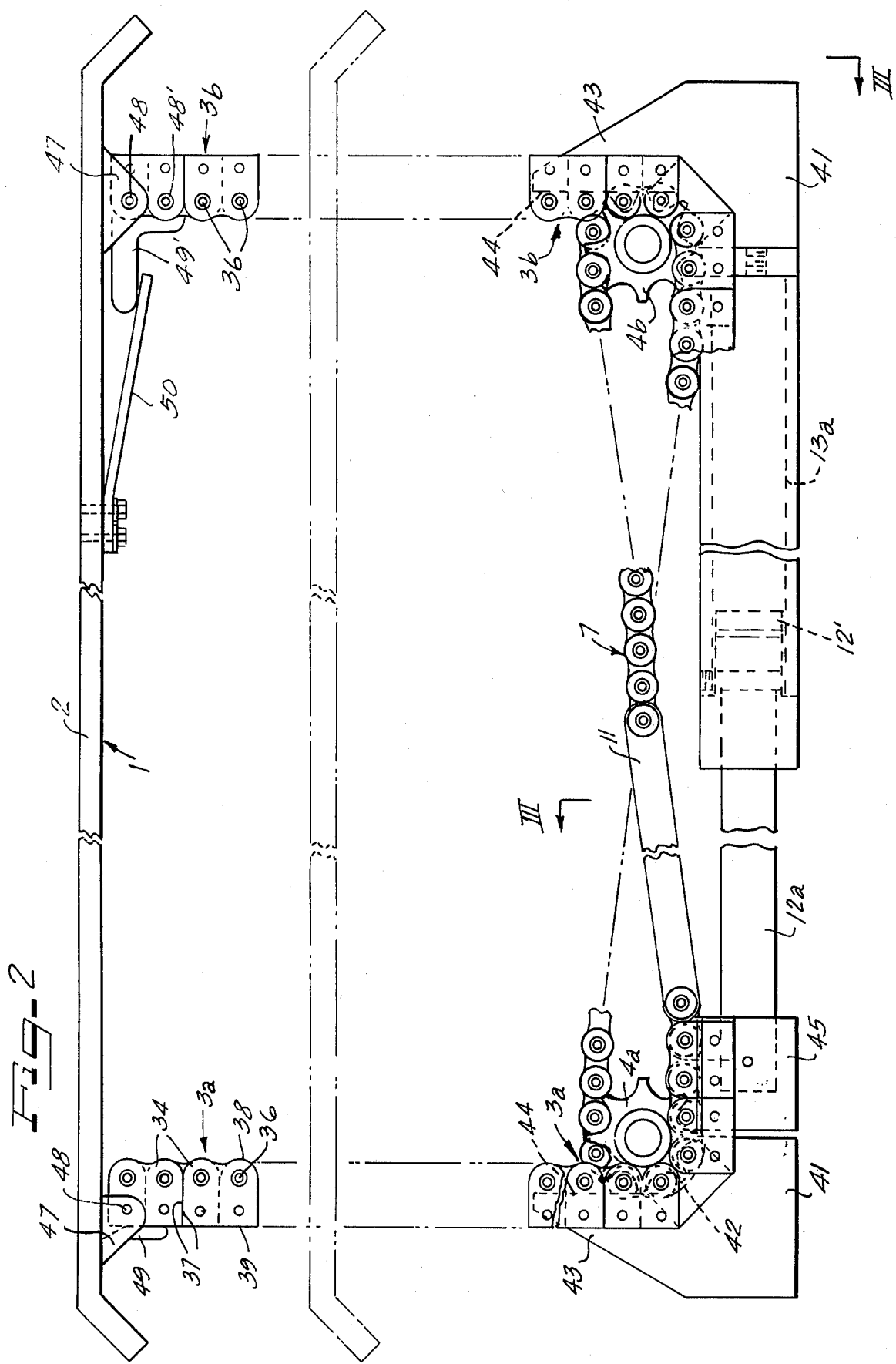
FIG. 2 is a top plan view, in greater detail, of a bumper structure such as illustrated in FIG. 1.

Referring to FIGS. 1 and 2, the reference numeral 1 indicates generally a bumper member which is adapted to be subjected to relatively heavy impact or shock loads, applied in the form of compression forces on the face 2 thereof. The member 1 is adapted to be supported by a plurality of chains 3a, 3b, 3c, and 3d each of which, as illustrated in FIG. 2, comprises a series of interconnected links, for example, of a construction similar to that illustrated in my prior U.S. Pat. No. 3,021,024, granted Feb. 13, 1962. Each chain assembly is secured at one end to the bumper member 1 with its opposite end passing around sprocket means, indicated generally by the numeral 4; with the sprocket means 4a being associated with chain 3a, sprocket 4b with chain 3b, etc. The sprockets 4a and 4c are illustrated as rigidly mounted on a shaft 5, and in like manner the sprocket 4b and 4d are mounted on a similar shaft 6 with the two shafts being connected by suitable means such as standard roller type chain 7 operatively connecting sprockets 8 and 9 rigidly mounted on the respective shafts 5 and 6. The chain 7 is disposed in a figure eight configuration with the one intermediate portion being provided with a rigid section 11, which is so constructed that the other intermediate portion of the chain may readily freely pass therethrough.

As illustrated, the inner end of the chain 3a is secured to the piston rod 12a of a hydraulic cylinder 13a which is stationary relative to the shafts 5 and 6, and in like manner the inner end of the chain 3d is connected to the piston rod 12b of the hydraulic cylinder 13b. In this construction the free ends of the chain 3b and 3c are guided by suitable guide members 14 which are operatively merely to maintain the adjacent end of the associated chain in a position substantially at right angles to the portion thereof extending from the associated sprocket to the bumper member 1. Springs 14' may assist.

The cylinders 13a and 13b, for example, may be similar in construction to a tubular vehicle shock absorber and operative to cushion or absorb shock loads applied as compression forces on the cylinder and associated piston rod. Thus, the piston rod 12a will offer resistance to compression forces applied thereon by the interconnected end of the chain 3a, and in like manner similar compression forces exerted by the chain 3d will be applied to the piston rod 12b. It will be appreciated that as the sprockets associated with the shaft 5 are rigidly connected thereby, and the sprockets associated with the shaft 6 are rigidly connected thereby, the chains 3a and 3c will cooperate to apply compression forces on the piston rod 12a, while the chains 3b and 3d will cooperate to apply compression forces to the piston 12b. At the same time, as the shaft 5 and 6 are operatively connected by the chain 7 for rotation in opposite directions, torque applied on one of the shafts 5 or 6 by the associated chains will be transmitted to the other shaft. As a result, impact forces applied to the bumper member 1 will be transmitted to both shafts 5 and 6 and thus to both cylinders 13a and 13b, with the bumper member 1 thus being maintained in a plane that will remain normal to the adjacent portions of the chains 3a through 3d, as said plane moves in such normal direction. As subsequently described in detail, suitable guide means are provided adjacent each of the sprockets 4 to insure retention of the chain in engagement with the sprocket and a transfer of compression forces to the associated piston rod 12.

In some cases the cylinders 13a and 13b could be simple shock absorber type structures, for example, spring biased to position the associated piston rod in its extended position. In the construction illustrated in FIG. 1, the structures 13a and 13b are simple hydraulic cylinders, the respective piston rods 12a and 12b carrying respective pistons, with each of the respective cylinders having a fluid port 15 adjacent the rod end of the cylinder and a similar port 16 adjacent the opposite end of the cylinder.

Figure 6:
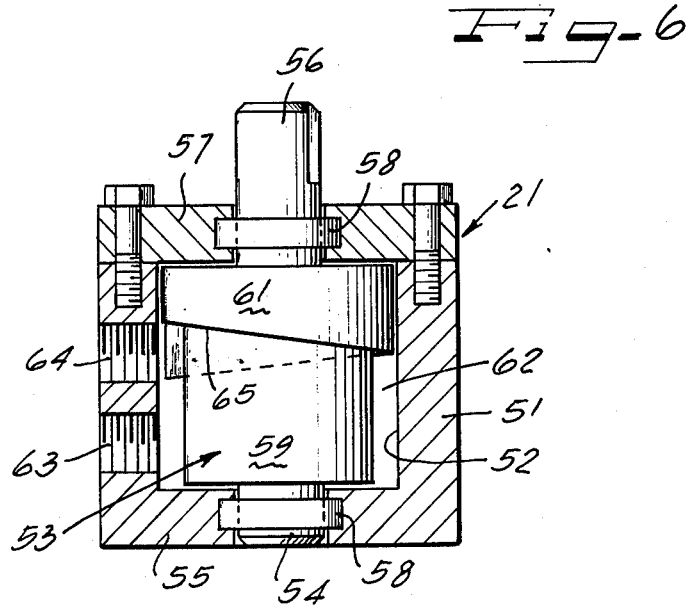
FIG. 6 is a transverse sectional view through a control valve which may be utilized with the invention.

The ports 15 are connected in common by a suitable line 17 which in the illustrated example communicates with the atmosphere. In like manner the ports 16 are connected in common and connected to the fluid supply 18 through a control valve 21, details of which are illustrated in FIG. 6 and which will subsequently be discussed in detail in connection therewith. As illustrated the ports 16 are connected to the control valve 21 by a line 22 with the control valve being connected to the fluid supply 18 by the line 23. The control valve 21 is of rotary design having an adjusting shaft 24 connected by a chain 25, sprocket 26 on the shaft 24 and sprocket 27 on the shaft 5 whereby rotation of the latter is transmitted to the shaft 24 with the sprockets 26 and 27 being of such relative sizes that the shaft 24 will have a predetermined amount of rotation relative to the total rotation of the shaft 5 under the action of the chains 3a and 3c.

The valve member 21 is so constructed that rotation of the shaft 24 will vary the effective size of the valve opening through which fluid must flow from the line 22 to the line 23, and thereby control the characteristics of the piston movement of the respective hydraulic cylinders. Thus by suitable design of the valve 21, the shock absorber characteristics of the structure may be varied in dependency upon the travel of the bumper member 1 under impact loads. For example the valve 21 could be so designed that relatively little resistance or greater was presented to the initial movement of the bumper member 1, with such resistance continuously increasing or decreasing with continued movement of the bumper member or varying in any desired sequence.

During such operation of the device, under compression loads applied to the bumper member 1, fluid will flow from the respective cylinders 13, through the ports 16 and valve member 21 to the reservoir 19, with air from the extension flowing through the line 17 and ports 15 to the opposite end of each cylinder.

For the purposes of illustration it will be assumed that the reservoir 19 is provided with a piston 28 therein, which is urged downwardly by suitable means as for example a compression spring 29. It will be appreciated that the reservoir 19 could be of air-over-oil type whereby pressure is exerted on the supply 18 by a pressure head of air, for example, as supplied by an air compressor or the like.

Connecting the line 23 with the line 22, and thus shunting the valve 21, is a check valve 31 which is operative to let fluid flow freely from the supply 18 to the line 22 and ports 16, but will not permit flow in the opposite direction, thus forcing such opposite flow to pass through the valve 21.

With this relatively simple arrangement, fluid pressure in the reservoir 19, applied through the check valve 31 and line 22 to ports 16 will urge the pistons and associated pistons rods 12a and 12b to their extended position as illustrated in FIG. 1 extending the bumper member 1 whereby the latter will normally be retained in an extended position. Upon being subjected to impact loads, the bumper member 1 will move inwardly and compression forces will be transmitted from the chains 3a – 3d to the corresponding associated piston rod 12a and 12b to force fluid from the cylinders 13a and 13b through the valve 21 into the reservoir 19, with an amount of air flowing freely from the exterior to the ports 15 at the opposite ends of the respective cylinders.

The pressure in the line 22 resulting from impact loads applied to the respective cylinders may be operatively applied to a pressure responsive switch 32, which may form a part of a safety system, for example the so-called air bag-type system, wherein, upon impact, a balloon is rapidly inflated to cushion occupants in the vehicle and prevent them from moving forward and striking the dash, windshield, etc. As such switch is directly responsive to impact loads on the bumper, the actuation of the switch will be extremely fast, eliminating lags that may otherwise exist in an inflation system of this type if separate or indirectly operated actuated means were employed, for example, an inertia responsive switch or the like.

In this arrangement the cylinders 13a and 13b may be of the single acting type, in which the actuating fluid from the supply 18 communicates with only the ports 16, with the opposite end of each cylinder, adjacent the associated piston rod, being vented through the line 17 to atmosphere, for example through a suitable air filter 33. As previously mentioned, the tension forces exerted by the springs 14' on the free end of the chains 3b and 3c may be sufficient merely to keep the chain ends tensioned and eliminate any slack therein, insuring free movement of the chains. Likewise, the force exerted on the fluid supply 18, whether by air or other means need be sufficient only to insure that under normal conditions, in the absence of any load on the bumper member 1, the latter will be maintained in its fully extended position as a result of the application of fluid pressure through the check valve 31 and ports 16 to the adjacent sides of the associated pistons.

Figure 3:
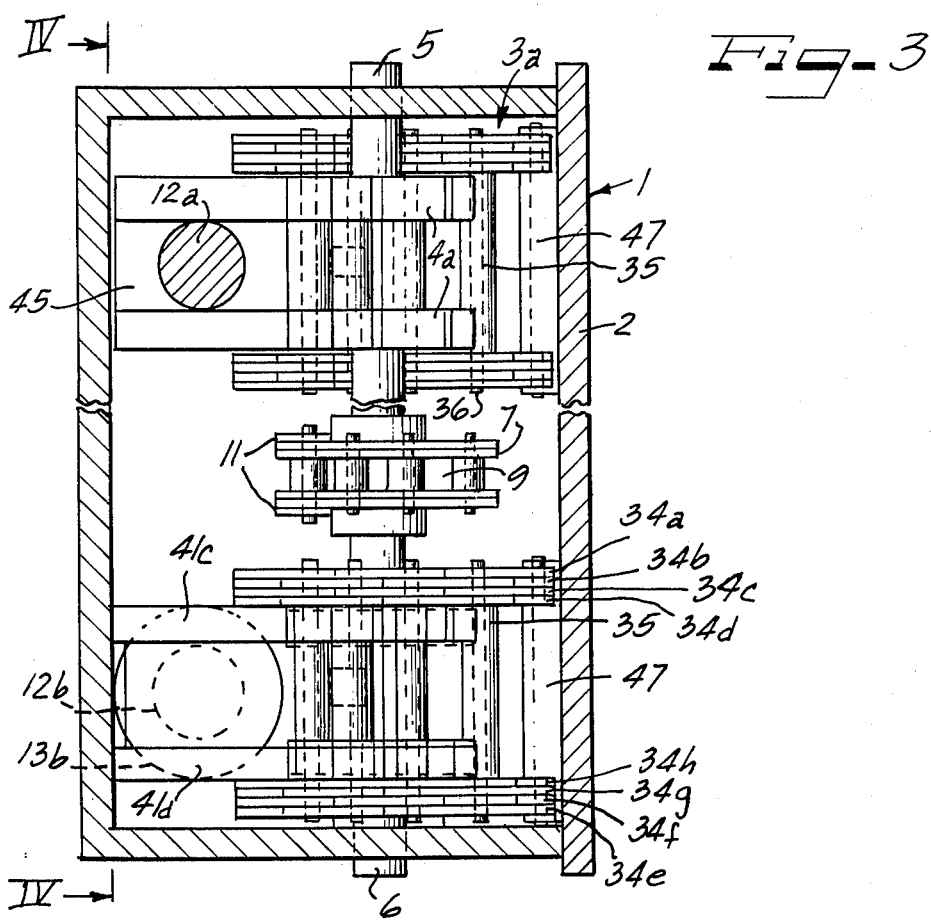
FIG. 3 is a sectional view taken approximately on the line III—III of FIG. 2.

FIGS. 2 through 4 illustrate details of construction of a bumper structure such as schematically illustrated in FIG. 1. The chains structures 3a – 3d are of the type adapted to be rigid in compression, in which the side plates of the chain are provided with end edges which abut when the chain is extended in a straight line, with the compression forces being transmitted from one side plate to the next. Chains of this general type are known, for example as illustrated in the previously referred to patent, in which chains of such type are utilized to operate a pusher mechanism for a fork lift truck or the like. The chains here involved and the sprocket structure therefor are constructed to insure retention of the chains in desired operative positions and transmit applied compression loads to such sprocket structures. Thus the chains 3a – 3d each comprise a plurality of series of side plates 34 which are adapted to connect a plurality of rollers 35. In the embodiment illustrated, as clearly illustrated in FIG. 3, four series of side plates 34 are employed at opposite ends of the respective rollers 35. The four series of side plates, disposed at corresponding ends of the rollers, are alternately staggered whereby the side plates of one series span the junctures of abutting side plates of the adjacent series, with the series at opposite ends of the rollers being connected by connecting pins 36, each of which extend through an associated roller. The ends of the pins 36 may be suitably fastened to the outermost series of side plates by any suitable means, for example, welding or adequate swedging etc.

As will be apparent from a reference to FIG. 2, each side plate 34 is provided with parallel end edges 37 which extend at right angles to a line connecting the pins 36 associated with such side plate. Thus when the chain is extended in a straight line, the edges 37 of adjacent side plates abut, whereby compression forces may be transmitted from one end of the chain to the other so long as the same remains in a straight line. The pins 36 are disposed adjacent one longitudinal edge of the associated side plates, for example the edge 38, the opposite edges 39 being illustrated as extending parallel to the axis of the chain when the latter is in a straight line. As illustrated in FIG. 2, each of the chains 3a–3d is guided as it passes around the associated sprocket 4 by a pair of guide members or blocks 41, each of which have an arcuate inner edge 42 concentric with the axis of the associated sprocket. The radius of such edge coincides with the outermost arcuate path of the rollers 35 as they pass around the sprocket, so that such rollers may also ride on such arcuate edge which thereby cooperates with the sprocket to transmit compression forces, transmitted by the chain from the bumper member 1, in a direction at right angles to the extended portion of the chain, i.e., in the direction of the axis of the associated piston rod 12. The load forces thus are effectively transmitted in a direction transverse to the direction of travel of the bumper member 1, i.e., in this example, at 90° to the latter direction. As illustrated in FIG. 2, each of the guide members 41 is provided with an outwardly extending extension 43, having an inner edge 44 which extends tangentially to the arcuate edge 42 thereof and parallel to the direction of movement of the bumper member 1, whereby such extension also tends to maintain the extended portion of the associated chain in a straight line, prevent buckling of the chains in a laterally outward direction, and thus provide lateral stability.

As illustrated in FIG. 2, the outermost end of each piston 12 is provided with a head 45 rigidly mounted thereon which has a length in the direction of movement of the piston such that one or more complete links of each series of side plates is secured thereto, such head taking the place of the corresponding roller and secured to the side plates by suitable means such as pins 36. The respective heads 45 thus serve the same general function as the projection 43 of the guide member 41, i.e., to maintain the chain extending from the associated sprocket to the associated piston rod in a straight line whereby load forces on the bumper member 1 will be transmitted through the extended portion of the chain around the associated sprockets, and from there in a straight line to the end of the associated piston rod, which thus receives such forces and moves inwardly into the associated cylinder in a manner as determined by the operation of the valve 21.

As illustrated in FIGS. 2 and 4 the chain 7 is provided with an elongated link 11 at each side of the chain which links are sufficiently spaced to enable the other intermediate section of the chain to pass therethrough and complete the figure eight configuration. The length of the links 11 are such they will travel from adjacent one sprocket to adjacent the opposite sprocket during the full travel of the bumper member 1 from fully retracted to fully extended position whereby the link 11 will not engage either of the cooperable sprockets.

FIG. 5 illustrates, in plan, the outer or free end portion of one of the chain members, illustrating one construction of attaching the free end of the chain member to the bumper member 1. As previously mentioned the side plate assemblies, at each side of an associated chain, comprise four series of side plates which are alternately staggered, the side plates of the respective series being designated by the letters 34a – 34h. Thus, as viewed in FIG. 3, the side plates of the respective series at the top of each chain member are respectively designated 34a, 34b, 34c and 34d, with the plate 34a being at the exterior of the series and the plates 34d being adjacent the rollers 35. In like manner, the side plates of the respective series of the bottom of each chain member are respectively designated, from the outermost to the innermost, 34e, 34f, 34g and 34h.

The figure illustrates the end portion of the chain structure and its connection to the bumper member, with portions of the respective series of side plates broken away (illustrating merely the two uppermost series at the top of the chain member, comprising plates 34a 34b, and only the uppermost series at the opposite or bottom side of the chain comprising the plates 34h). It will be noted that each of the side plates is provided with an additional pair of bores 46 therein, which are longitudinally spaced in alignment with the associated bores in such side plates through which the pins 36 extend, the bores 46 generally being symmetrically disposed. The free ends of the adjacent series of side plates at opposite ends of the chain rollers 35 are operatively connected to the bumper by a cooperable lug 47, rigidly mounted on the bumper member, by a plurality of pins 48, three being employed in the construction illustrated, which extend through the last three series of bores 46 in the side plates. The end of the chain is thereby rigidly supported, and in view thereof, as well as the fact that the line of pins 48 is laterally offset from the line of connections between the links formed by the respective pins 36, the applied compression forces from the impact loads on the bumper member will tend to resist buckling of the extended portion of chain, corresponding to its breaking or buckling around the respective sprockets.

FIG. 2 illustrates two additional constructions by means of which the free end of a chain may be connected to the bumper member.

In the construction at the left side of the figure, the bracket or lug 47 is so constructed that it will receive only a single pin 48 which passes through the endmost aligned bores of the chain side plates. As the free end of the chain member thus is freely rotatable on the pin 48, which pin is offset from the line of connections between the links. The pin 48 thereby applies vector forces on the side plates in a direction tending to resist buckling of the extended portion of the chain, corresponding to its breaking or buckling around the respective sprockets.

Thus the applied compression forces on the chain also tend to eliminate any buckling tendency. If desired the lug structure 47 may be provided with a similar extension 49 which extends adjacent the edges 39 of the side plates, whereby it will not interfere with the associated guide member 41, the member 49 being so proportioned and arranged with respect to the side plates that it provides further means tending to prevent outward movement of the extreme end side plates in a direction permitting buckling movement of the chain, thereby counteracting such movement.

In the construction at the right side of FIG. 2, pressure is applied to the free end of the chain, tending to rotate the same in a direction counteracting any tendency of the chain to buckle. In such construction the bracket or lug 47 is of a construction similar to that at the left side of FIG. 2, with the pin 48 extending through the aligned bores of the endmost side plates and through an L-shaped member 49'. The pin 48 extends through the intermediate portion of the member 49, with the cooperable leg thereof being secured to the adjacent side plates by an additional pin of 48' whereby the endmost series of side plates are rigidly connected to the member 49'. The free leg of the latter is adapted to receive pressure from one end of a leaf spring 50, the opposite end of which is rigidly secured to the bumper member. The spring 50 will thus apply forces on the member 49 tending to rotate it and the side plates connected thereto in a clockwise direction about the axis of the pin 48 connected with the lug 47, thereby applying pressure to the chain in a direction opposing buckling thereof.

It will be appreciated that the arrangement could be reversed whereby the free arm of the member 49' extends to the right of the pivotal connection of the chain to the bumper member, whereby a suitable compression spring may be employed between the free end of the arm and a portion of the bumper member, thereby likewise applying forces on the member 49' tending to rotate it in a clockwise direction and thus applying the desired pressure on the chain.

As illustrated in FIG. 1, corresponding chains at the same end of the bumper structure may be connected by employing common pins 36 of a length to extend between the respective cooperable chains. Thus the chains 3a and 3c may be so connected, and also the chains 3b and 3d. Such common pins may be spaced, for example every third or fourth pin, or all pins may be common to the cooperable chains of a pair. Greater vertical rigidity of the chains is thereby achieved.

FIG. 6 illustrates details of the control valve 21 illustrated in FIG. 1, which for example may comprise a cup-shaped housing member 51 having a cylindrical chamber 52 therein. Disposed in such chamber is a generally cylindrical valve member 53, rotatably supported by a stub 54 journalled in the end wall 55 of the housing 51 and an actuating shaft 56 rotatably supported in the cover member 57, the shafts 54 and 56 being suitably sealed with respect to fluid flow thereat by respective seals 58 suitably designed to withstand the pressures involved. As illustrated, in FIG. 6, the lower portion of the valve member 53 is provided with a cylindrical portion 59 of relatively small diameter and a cooperable cylindrical portion 61 axial adjacent thereto of a diameter slightly less than the internal diameter of the bore 52 whereby an annular chamber 62 is formed which is adapted in one position of the valve member to connect a pair of fluid ports 63 and 64, the port 63 forming an inlet port when the valve 21 is arranged as illustrated in FIG. 1, and the port 64 forming the outlet port. It will be noted that the inner end edge 65 of the relatively large portion 61 is provided with a pitch, i.e., a helical configuration, whereby clockwise rotation of the shaft 56 (when looking down upon the same) will result in the portion 61 successively covering more and more of the port 64 until the latter approaches a closed position. Referring to FIG. 6, the embodiment therein illustrated has a portion provided with a horizontal edge 59. The valve 21 thus functions as a port of varying size in the fluid path from the hydraulic cylinders 13 and thus controlling the shock absorbing characteristics of the system.

It will be particularly noted that the construction of the valve 21 provides a very flexible design by means of which flow characteristics through the valve may be widely varied. Thus, by suitable configuration of the inlet port and the configuration of the end wall 65 the flow characteristics may be readily varied from a linearly progressive opening or closing to a non-linear or even repetitive progression, the progression normally continuing in the same direction insofar as the application of the valve to the present invention.

The embodiment of the invention heretofore described has utilized a shock absorber structure in which the cylinder thereof is carried by the vehicle in relatively fixed relation and the piston operatively connected to the adjacent ends of chain members at one side of the structures, for actuation by such chain members. In some applications it may be desirable to have the shock absorber cylinder actuated by two chains acting in opposite directions, i.e., to support the cylinder for axial movement and to apply compression forces exerted by one chain member on the piston rod and apply compression forces exerted by a second chain on the cylinder.

Figure 7:
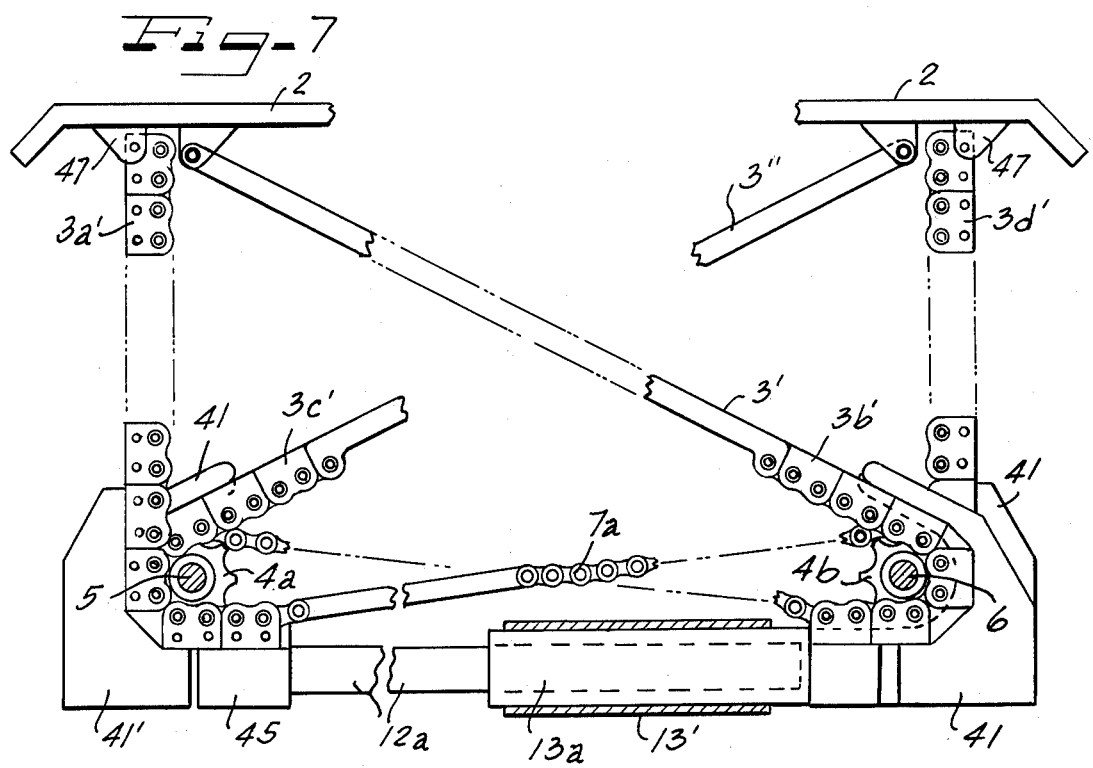
FIG. 7 is a fragmentary plan view similar to FIG. 2 illustrating a modification of the invention.
Figure 8:
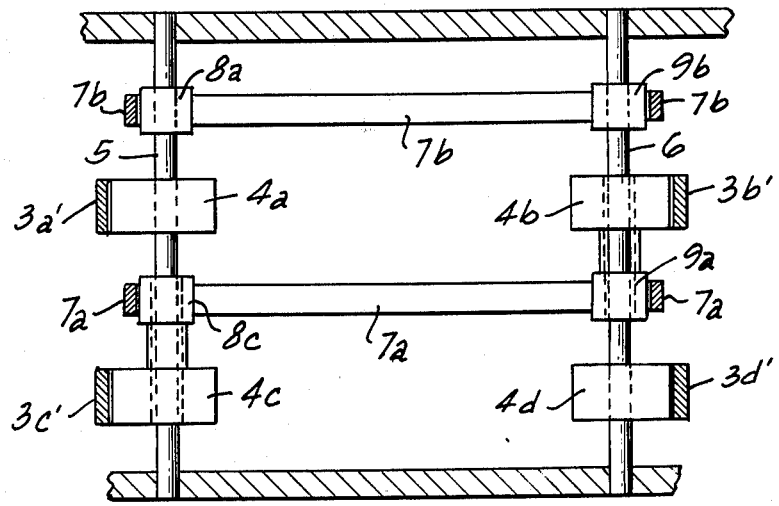
FIG. 8 is a diagrammatic view, similar to FIG. 4, illustrating the operating connections of the modification illustrated in FIG. 7.

FIGS. 7 and 8 illustrate a construction embodying this feature and at the same time illustrate a construction in which greater lateral stability is imparted to the bumper member than in the construction of FIG. 1. This is accomplished, in the embodiment illustrated, by utilization of a plurality of chains, two of which are respectively connected to the bumper member adjacent opposite ends thereof, each of which pair are movable under impact loads on the bumper member in a predetermined relationship (for example, in the direction of impact), and two others, of which one is similarly connected to the bumper member, each of which second pair are movable under impact loads on the bumper member in a different predetermined relationship (for example in a diagonal direction), with each pair of chains having corresponding relationships being operatively connected to maintain equal travel thereof under such impact loads.

In this arrangement, the piston rod 12a of cylinder 13a is operatively connected with the adjacent inner end of the chain 3a', in substantially the same manner as previously described with respect to the construction of FIGS. 1 and 2 and, in like manner, the chain 3b' is attached at its inner end to the cylinder 13a, the chain extending around the sprocket 4b with its outer end extending diagonally and connected by a link member 3' to the bumper member 1, adjacent the connection of the chain 3a' thereto, whereby impact loads on the bumper 1 are transmitted to both the associated piston and cylinder. The latter may be slidably supported by suitable means such as a fixed sleeve 13'. In the embodiment illustrated, the chains, 3c' and 3d' are similarly arranged, with the connecting link 3" connecting the outer end of the chain 3c' with the bumper member adjacent the connection of the chain 3d' thereto. As illustrated in FIG. 8 two chains 7a, and 7b are utilized to connect the respective sprocket members 4. Thus sprocket 4c and connecting chain sprocket 8c are rigidly connected and rotatable on shaft 5 while sprockets 4b and 9a are rigidly connected and rotatable on shaft 6. The sprockets 8a and 8b are connected by the chain 7b, so that the sprockets 4b and 4c must rotate together. In like manner sprockets 4a and 8a are rigidly connected and may be rigidly connected to the shaft 5, while sprockets 4d and 9a are rigidly connected through the shaft 6. Thus the sprockets associated with the diagonally extending chains will rotate together and sprockets associated with the outwardly extending chains will be connected together, whereby the bumper structure will at all times move, in a fore and aft direction, normal to the face of the bumper.

It will be appreciated that, if desired, additional chains may be incorporated in the bumper structure of FIG. 7 to provide additional vertical stability, or the links 3' and 3" may be so designed with sufficient vertical height, particularly at the outer ends thereof that additional vertical rigidity of the bumper member is achieved.

Likewise, it will be apparent that the double action employing movable cylinders, may be utilized in connection with an arrangement similar to that illustrated in FIG. 1. For example the chain 36 could be connected at its inner end to the adjacent end of the cylinder 13a, and the inner end of the chain 3c to the adjacent end of the cylinder 13b. In this case as all chains travel the same distance all sprockets on the same shaft may be rigidly connected thereby and a single chain 7 will suffice.

FIGS. 9 – 14 illustrate electrical and hydraulic circuits for effecting desired operation of the structures heretofor described, in which FIG. 9 diagrammatically illustrates a control circuit adapted to be utilized with the electrical circuit of FIG. 10, employing an electric motor in cooperation with a hydraulic system such as illustrated in FIG. 11, to extend and retract the bumper structure or with the electrical circuit of FIG. 12 operable to control a hydraulic pump in conjunction with hydraulic circuit of FIG. 13, in which actuation of the bumper structure is effected by hydraulic means.

Referring to FIG. 11, the cylinders 13a and 13b are illustrated as being connected in common, by a conduit or line 66 to a two way valve 67, for example, a solenoid type valve adapted to be energized by either of two windings $S_1$ or $S_2$. The opposite side of the cylinders 12a and 12b, i.e., at the piston rod ends of the respective cylinders, are operatively connected through the line 68 to one port of the valve 67 and through line 69 to a reservoir 71, liquid, for example oil 72. The other port of the valve 67 is operatively connected through a pressure valve 73 and the metering valve 21 with the line 68. Pressure operative switch 74, disposed in the line between the pressure valve 73 and the metering valve 21, may be utilized for the actuation of safety equipment in response to the existence of impact loads on the bumper structure.

Briefly, the system of FIG. 11 is so designed that during extension and retraction of the pistons rod 12a and 12b the valve 67 is actuated so that the lines 66 and 68 are interconnected so that fluid is free to flow from one end of the respective cylinders 13a and 13b to the other ends thereof, whereby the pistons of the cylinders may be relatively freely moved therein. With the piston rods 12a and 12b in fully extended position, and the valve 67 in normal position, as illustrated in FIG. 11, the return path for fluid, in the presence of impact loads upon the bumper structure and thus upon the piston rods 12a and 12b, is through the pressure valve 73 and metering valve 21 to provide the desired shock absorbing action. The pressure valve 72, is operative to prevent flow through the metering valve 21 until a predetermined pressure exists in the line 66, as determined by the valve, thereby insuring that during vehicle operation, the bumper member will be retained in the desired position.

FIGS. 9 and 10 illustrate respective portions of the electrical circuit employed with the hydraulic circuit of FIG. 11, FIG. 9 illustrating the controlling circuitry which is also common to the hydraulically actuated system of FIG. 13, with FIG. 12 illustrating the specific actuating circuit for such hydraulic system.

The control circuit of FIG. 9 comprises a speed responsive switch, indicated generally by the numeral 75, of single pole-double-throw type, having a common contact 76 and respective cooperable contacts $77_R$ and $77_E$, the contacts 76 and $77_R$ being normally closed and the contacts 76 and $77_E$ being normally open, when the vehicle speed is below a predetermined value, for example 10 m.p.h. and upon vehicle speed reaching such predetermined value, contacts 76 and $77_E$ will close and contacts 76 and $77_R$ will open. Suitably associated with the travel of the bumper member for actuation in response thereto, for example with respect to the travel of the pistons 12a and 12b, are respective limit switches $78_R$ and $78_E$. The limit switch $78_R$ is adapted to be opened when the bumper member reaches its fully retracted position while the switch $78_E$ is adapted to open when the bumper member reaches its fully extended position. Thus assuming that the contacts 76 and $77_R$ and the contacts of the switch $78_R$ are closed, under certain conditions, as hereinafter described, the line $79_R$ will be energized. In like manner, assuming that the contacts 76 and $77_E$, and the contacts of the switch $78_E$ are closed, the line $79_E$ will be energized, i.e., for example, is operatively connected to one side of a battery (ground). The other side of the battery, preferably from the accessary side of the ignition switch is operatively connected to the lines designated +.

Referring to FIG. 10 it will be noted that the lines $79_R$ and $79_E$ respectively are connected to the reverse and forward terminals of a motor 81 while the common terminal thereof is adapted to be normally connected to the other side of such a battery (+) over the pressure switch 74. The latter is of single pole-double-throw type and is provided with a common contact 82 and respective cooperable contacts 83 and 84, the contacts 82 and 83 being normally closed to connect the motor to the power source. As illustrated, the windings $S_1$ and $S_2$ are connected in common at one of their ends to one side of the battery (+), over the contacts 82–83 and their opposite ends to the respective lines $79_R$ and $79_E$. Thus assuming that the line $79_R$ is energized, the motor will be actuated in reverse direction, and when the line $79_E$ is energized the motor will be actuated in forward direction. The motor 81 may be operatively connected at any suitable point in the bumper mechanism, operative to extend or retract the same and, for example may be operatively connected to one of the shafts 5 or 6, or may be connected by a suitable sprocket to the chain 7 whereby actuation of the motor will in turn move the chain 7 to effect a retraction or extension of the bumper structure.

In the event that the vehicle does not incorporate impact responsive safety means, the common side of the motor 81 may in an appropriate circuit be directly connected to the power source. The switch 74, however, preferably is included, for the additional purpose of rendering the electrical system inoperative in the event of impact loads. Thus the motor and windings $S_1$ and $S_2$ are connected to the power source through the normally closed contacts 82–83. Contact 81 is operatively connected to the safety device 84 over the normally open contacts of a speed responsive switch 85. The switch 85 may for example, be actuated by the same means operable to actuate the speed control switch 75, with the switch 85 being closed when the vehicle reaches a speed, above which it is desired to actuate the safety device in the event of an impact, for purposes of illustration, 20 m.p.h.

Assuming that the bumper structure is to be retracted, either to a fully retracted or partially retracted position when the vehicle is parked or the like, the line $79_R$ is connected to the contact $77_R$, not only in series with the limit switch $78_R$ but also in series with additional contacts 86, 87 on the ignition switch 88, which contacts are arranged to be normally closed when the ignition switch is in "off" position, and open when the ignition switch is in "on" position. Thus, assuming that the vehicle is stationary and the bumper extended, i.e., contact $78_R$ closed, upon turning off the ignition, contacts 86 – 87 will be closed, energizing the line $79_R$ and resulting in actuation of the motor 81 in a reverse or retracting direction. Simultaneously therewith, energization of the line $79_R$ will result in energization of the windings $S_1$ of the valve 67, to actuate such valve to a position operatively connecting the lines 66 and 68 and disconnecting the line 66 from the pressure valve 73 etc. Under such conditions fluid is free to flow from one side of the cylinders 13a and 13b to the opposite side thereof, whereby the bumper structure may be readily mechanically retracted without material interference from the hydraulic system. Upon the bumper reaching its desired retracted position the switch $78_R$ will open, thereby shutting off the motor and permitting the valve 67 to return to its normal position operatively connecting the line 66 with the pressure valve 72.

It will be appreciated that with the circuit just described, the bumper structure will remain extended as long as the ignition switch is in "on" position (contacts 86, 87 open). Retraction will take place only when the contacts 76 – $77_R$ and switch $78_R$ are closed and the ignition switch turned "off" to close contacts 86 – 87, thereby resulting in retraction of the bumper structure until the switch $78_R$ is opened as the bumper structure reaches its retracted position.

To provide retraction of the bumper structure when the driver, for example, desires to park the vehicle, in which case the fully extended position of the bumper may not be desired, a relay 89 is provided, having an actuating winding 89w and respective pairs of contacts 91a and 91b each pair being adapted to be closed when the winding 89w is energized. As illustrated, the contacts 91a shunt the contacts 86 – 87 of the igntion switch 88, with one side of the winding 89w being connected to the cooperable contact of the switch $78_R$ and contact 86 of the ignition switch, while contacts 91b are adapted to operatively connect the opposed end of the winding 89w to the battery (+) over line 92. The contacts 91b are operatively shunted by a switch 93 adapted to be closed, for example, when the vehicle gear shift lever is manually moved to or through its neutral (N) position. Thus assuming the vehicle is in operation, and it is desired for example, to park the same, upon the vehicle being brought to a stop, contacts 76 − $77_R$ and the contacts of switch $78_R$ will be closed and upon moving the gear shift lever through neutral, the switch 93 will at least momentarily close, energizing relay winding 89. Upon such energization, the pairs of contacts 91a and 91b will be closed. Closure of contacts 91a results in energization of line $77_R$ while closure of contacts 91b locks in the winding 89w. The motor 81 and winding $S_1$ thereupon will be actuated, effecting retraction of the bumper structure until switch $78_R$ opens. Winding 89w will thereupon be de-energized opening contacts 91a and 91b.

To enable a full understanding of the entire operation of the structure thus far described, it will be assumed that the vehicle is parked with the ignition switch "off." Under such conditions, the contact 76, 77 and contacts 86 − 87 will be closed and switch $78_R$ and contacts pairs 91a and 91b will be open. At the same time contacts 76 − $77_E$ will be open and limit switch $78_E$ will be closed. Upon actuation of the ignition switch, contacts 86, 87 will be opened and the system will remain unactuated. However, as switch $78_E$ is closed, upon the vehicle reaching the desired predetermined speed, contacts 76 − $77_E$ will close and contacts 76 − $77_R$ will open. Upon closure of contacts 76 − $77_E$ the line $79_E$ will be energized, energizing the winding $S_2$ to open the valve 67 to its actuated position connecting lines 66 and 68, and motor 81 will be actuated in a forward direction to extend the bumper. To insure the contacts 82 − 83 of the pressure switch 74 being closed to permit such actuation, the switch 74 may be provided with a reset winding 74' adapted to be actuated when the ignition key is turned to starter-actuating position so that in the event, for any reason, the contacts 82 − 83 were open, upon starting the engine, the winding 74' would be actuated to effect a closure of such contacts.

When the bumper structure reaches its fully extended position, the switch $78_E$ will open, the switch $78_R$ now being closed. It will be appreciated that under such conditions as long as the gear shift lever remains in a drive position (not moved or passed through neutral) in the event the vehicle speed falls below the actuating speed of the switch 75, the contacts 76 − $77_R$ will be closed and while the switch $78_R$ is likewise closed, as contacts 86 − 87, as well as contacts 91a and switch 93 are all open, the bumper structure will remain in extended position. However, if under such circumstances the driver shifts the gear shift lever through neutral, for example, into reverse, closure of the switch 93 will effect energization of the winding 89w, closing contacts 91a and 91b, locking in relay 89 and closing the circuit from switch 75, switch $78_R$ and contact 91a to the line $79_R$ resulting in energization of the winding $S_1$ and actuation of the motor 81 in reverse or retracting direction, which operation will continue until the switch $78_R$ opens.

In the construction of FIGS. 12 and 13, the bumper structure is adapted to be extended and retracted hydraulically by a suitable source of liquid under pressure, as for example by means of the operation of a motor driven pump 81'. In the event some other source of liquid under pressure is available, there may be substituted for the pump 81', and motor 81 a suitable electrically actuated valve adapted to correspondingly supply liquid under pressure to the system. Referring to FIG. 13 it will be noted that the general circuit including the cylinders 13a, 13b, valve 67, pressure valve 73, metering valve 21 and switch 74 for actuation of a safety device, are disposed in substantially the same relationship as in the circuit of FIG. 11, a check valve 94 being inserted in the line from the metering valve 21 to the line 68, to prevent a reverse flow, when pressure exists in the line 68, through the metering valve 21 and associated elements, and thus eliminate the possible application of pressure through the metering valve 21 to the switch 74.

In this arrangement the inlet side of the pump 81' is operatively connected to the reservoir 71 for the liquid supply 72, with the outlet side of the pump being connected to a line 95 which in turn is connected by a valve 96 to one port of the valve 67, whereby upon appropriate actuation of the respective valves, liquid under pressure may be supplied to the line 66. The line 95 is similarly connected by a valve 97 with the line 68 whereby under suitable conditions liquid under pressure may be supplied to the line 68 for moving the bumper structure to a retracted position. The system of FIG. 13 is completed by a line 98 extending from the reservoir 71 and inlet side of the pump 81' to one port of the valve 96 and to one port of the valve 97.

The actuating electrical circuit for the system illustrated in FIG. 12, as illustrated in FIG. 13 and is also adapted to be controlled by the circuit of FIG. 9. In this arrangement the lines $79_R$ and $79_E$ are adapted to be connected to respective windings $99_R$ and $99_E$ of corresponding relays $101_R$ and $101_E$, the opposite ends of the respective windings being connected to the switch 74 in the same manner as heretofore described with respect to the motor 81. In like manner, the switch 74 is adapted to be operatively connected over the speed responsive switch 85 to a safety device 84. Each relay is provided with three pairs of normally open contacts a, b, and c, with the contacts a of either relay being operatively connected to the motor of the pump 81' for actuating such pump when the associated relay winding is energized. The contacts of the relay $101_R$ are adapted when closed to energize the winding 67w of the valve 67 while the contacts c of such relay are adapted, when actuated, to energize the winding 97w of the valve 97.

In like manner, the contacts b of the relay $101_E$ are adapted, when closed, to also energize the winding 67w of the valve 67 and the contacts c of such relay are adapted, when closed, to energize the winding 96w of the valve 96.

As the hydraulically actuated arrangement includes the circuitry of FIG. 9, which has been previously described, the operation of the system of FIG. 13 will be described only with respect to the circuitry of FIG. 12 when one or the other of the lines $79_R$ or $79_E$ is energized. Thus, assuming that the vehicle is in a parked position and the ignition "off" neither of the lines $79_R$ or $79_E$ will be energized. Switches $78_R$ and contacts 76 − $77_E$ will be open and switch $78_E$, contacts 86 − 87 and contacts 76 − $77_R$ will be closed.

Upon actuation of the ignition switch, contacts 86 − 87 will be open and reset solenoid 74 will be momentarily actuated as the engine is started to insure closure of contacts 82, 83.

No further action takes place until the vehicle speed exceeds the set predetermined value, at which time contacts 76 – $77_E$ close, energizing the line $79_E$ which in turn energized relay winding $99_E$ resulting in closure of contacts a, b, and c of such relay. With energization of the windings 67w and 96w, valves 67 and 96 are actuated, whereby the outlet of the pump 81' is operatively connected over line 95, valve 96 and valve 67 to line 66, actuating the pistons of cylinders 13a and 13b to extend the bumper structure. During this operation, fluid received into the line 68 from the opposite ends of the cylinders may flow through unactuated valve 97 to the inlet side of the pump 81' and the reservoir 71. Upon the bumper structure reaching its fully extended position, switch $78_E$ will open thereby permitting the winding $99_E$ to de-energize, opening the contacts a, b, and c thereof to permit the valves 67 and 96 to return to their normal unactuated positions as illustrated in FIG. 13. The opposite ends of the cylinders 13a and 13b are thus operatively bridged by the circuit comprising the pressure responsive valve 73, metering valve 21 and check valve 94, so that upon application of impact loads to the bumper structure, liquid may flow through the line 66, valve 73, metering valve 21 and check valve 94 to the line 68 and thus to the opposite ends of the cylinders. At the same time, any excess liquid may pass to the reservoir 71.

In the event the vehicle is stopped and the ignition switch turned "off," the line $79_R$ will be energized, energizing the relay winding $99_R$ and closing contacts a, b, and c of such relay. Again, the contacts a will actuate the motor of the pump 81', contacts b will energize the valve winding 67w, while the contacts c will energize the winding 97w of the valve 97. Under these conditions the outlet of the pump 81' is operatively connected over valve 97 to line 68, and adjacent ends of the cylinder 13a and 13b, tending to retract the piston rods 12a and 12b. Simultaneously therewith liquid is free to flow from the cylinders to line 66 and over actuated valve 67 and unactuated valve 96 and over line 98 to the inlet side of pump 81' and the reservoir 71. As a result of the presence of the check valve 94, pressure in the line 68 is not transmitted to the metering valve 21 or the switch 74. Retraction of the bumper structure will continue until the switch $78_R$ opens at which time the line $79_R$ will be de-energized.

In both of the systems described, it is assumed that the switch $78_R$ is so disposed with respect to the bumper structure, etc., that actuation of the switch to open position will take place at a predetermined point on the travel of the bumper structure from extended to retracted positions, for example with the bumper partially extended, say at five inches whereby the structure will still possess shock absorbing action in the event the bumper is struck while the vehicle is so parked.

In some cases, for example depending upon the nature of the vehicle and its operation, it may be desirable to fully retract the bumper structure, rather than retracting the same to an intermediate position, for example as previously described, at five inches extension, when the vehicle is parked with the ignition "off." The circuit of FIG. 9 readily adapts itself to provide this type of operation, employing two additional limit switches and an additional pair of contacts on the ignition switch, illustrated in dotted lines in the figure.

Referring to FIG. 9, there is provided additional limit switches $78_{R5}$ and $78_{E5}$ together with additional contacts 86' and 87' on the ignition switch 88, the contacts 86' – 87' being normally open when the ignition switch is in "off" position. The switch $78_{R5}$ is substituted for the direct connection between the associated contact of the contact pair 91a and the associated contact of the switch $78_R$, and contact 86 of the ignition switch, with the switch $78_{R5}$ being so disposed, with respect to the movement of the bumper structure and associated elements, that the contacts thereof will be open when the bumper structure is extended at 5 inches or less and closed when it is extended beyond 5 inches. The contact 86' of the ignition switch is, in this case connected directly to contact $77_R$ of the speed responsive switch 75 and the contact 87' is operatively connected in series with the switch $78_{E5}$ to the line $79_E$. Switch $78_{E5}$ is so positioned that it is open when the bumper structure is extended to five inches or beyond and closed when the bumper structure is extended less than five inches.

Assuming the vehicle is parked with the ignition "off," switches $78_R$, $78_{R5}$, contacts 86' – 87' and 76 – $77_E$ are all open while contacts 86 – 87, and switches $78_E$ and $78_{E5}$ are all closed. Upon actuation of the ignition switch 88 to "on," contacts 86 – 87 are opened and contacts 86' – 87' are closed, thus closing a circuit from ground through contacts 76 – $77_R$, 86' – 87' and switch $78_{E5}$ to line $79_E$, thereby energizing the same to effect operation of the associated control circuit and initiate extension of the bumper structure in the manner previously described for either the switches of FIGS. 10, 11 or FIGS. 12, 13. Extension will continue until the switch $78_{E5}$ opens thereby de-energizing the line $79_E$ as contacts 76, $77_E$ are open. The bumper structure will remain at the five inch extension until the speed responsive switch 75 is actuated thereby opening contacts 76 – $77_R$ and closing contacts 76 – $77_E$, energizing the line $79_E$ over closed switch $78_E$. Energization of the line $79_E$ again results in actuation of the extending mechanism, and the bumper is thereupon extended until switch $78_E$ is opened at the end of the extension travel.

At this point contacts 76 – $77_R$, contacts 91a and contacts 86 – 87 are all open while switches $78_{R5}$ are closed. Consequently even though the vehicle speed should drop to a point where switch 75 reverts to its normal condition, closing contacts 76 – $77_R$, the bumper structure will remain in extended position unless, while the circuit is in such condition, the gear shift lever is moved through neutral, closing switch 93 to actuate the relay 89. Relay 89, if so actuated, will close a circuit from switch 75 to line $79_R$ over switch $78_{R5}$, causing the actuating mechanism to effect retraction of the bumper structure until switch $78_{R5}$ opens.

If the vehicle is now parked and the ignition switch 88 turned "off" a circuit will be completed to line $79_R$ through contacts 86 – 87, switch $78_R$ and contacts 76 – $77_R$ causing retraction of the bumper structure until $78_R$ is opened at the extreme end of the retraction movement.

Where the bumper is to be extended at all times other than when under impact loads, in lieu of the arrangement illustrated in FIG. 1, employing the metering valve 21 reservoir 19 etc., it may be desirable to employ, for the cylinders 13a, 13b, adjustable shock absorbers such as are presently on the market, which are designed to provide predetermined decelleration characteristics. One type of such adjustable shock absorber is that manufactured by the Efdyn Corporation, Chicago, Illinois, designated as "Model ASA." When employing shock absorbers of this type of construction, of suitable length, capacity etc., they may be merely substituted for the cylinders 13a, 13b and associated control elements illustrated in FIG. 1, including the metering valve 21 and associated actuating elements, liquid reservoir 19, and all other lines etc., associated with the cylinders 13a and 13b. In this case the pressure switch 32 will be connected to one of the cylinders for response by pressure build up therein.

Figure 14:
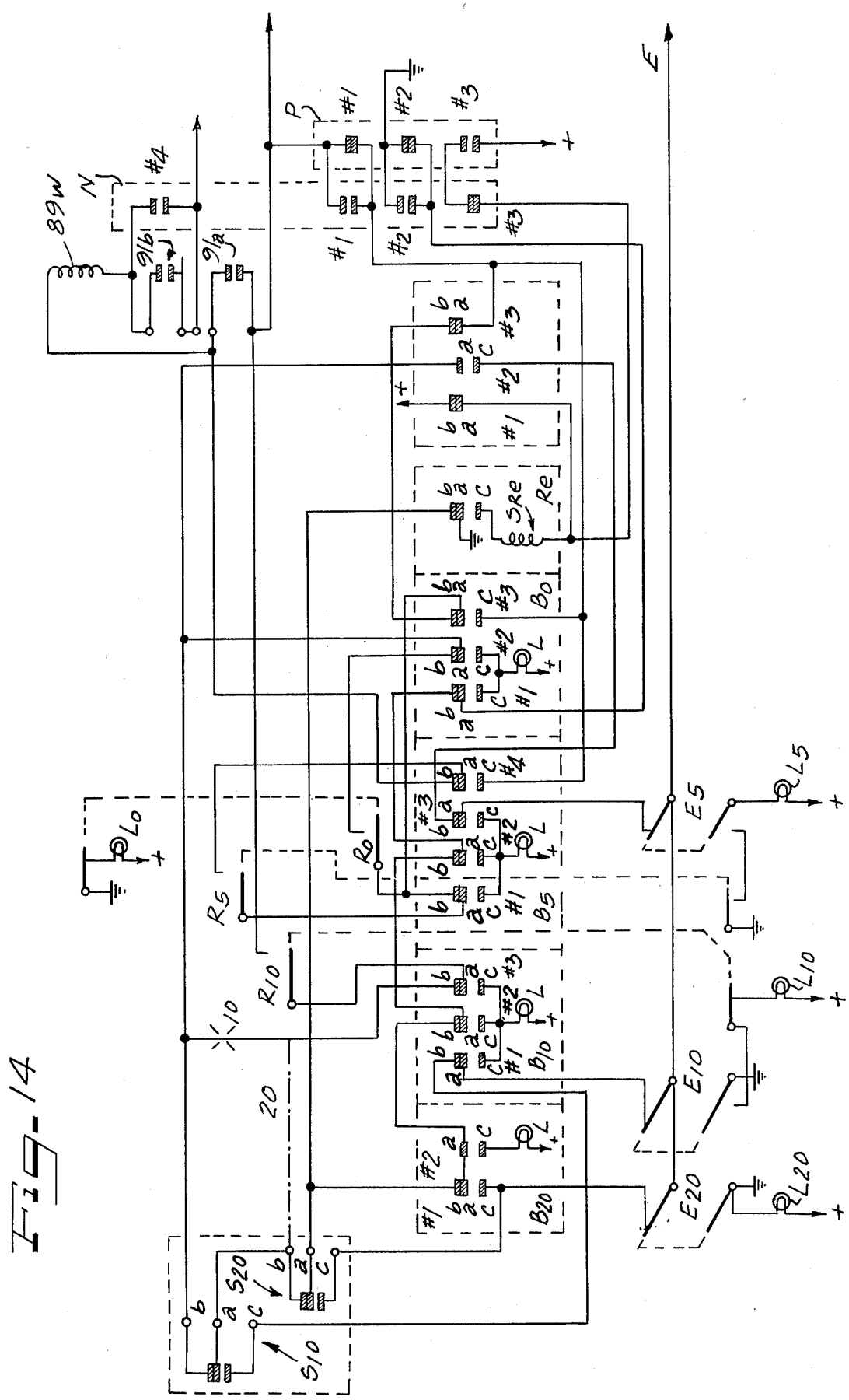
FIG. 14 is a schematic circuit, similar to FIG. 9, illustrating a more elaborate circuit including push button operation.

The present invention readily adapts itself to additional control of the retraction and extension of the bumper under predetermined conditions, FIG. 14 illustrating a circuit corresponding to that of FIG. 9 but more complex and providing control of the bumper structure under various vehicle conditions and in dependence upon the position of the gear shift lever.

FIG. 14 is intended to present some of the possible combinations achievable with the present invention and thus is intended to disclose how such features may be derived in conjunction with the remainder of the system. While all of the features illustrated could be incorporated in a single unit, it is unlikely that the specific combination of all of the features illustrated would normally be included in a single unit.

For the purposes of illustration it will be assumed that the control circuit illustrated in FIG. 14 is adapted to position the bumper structure at any one of four different positions. It will be apparent that each of the four positions may be disposed at any selected point on the extension and retraction path and merely for the purposes of the disclosure, it will be assumed that such positions, include a fully extended position, intermediate positions and a fully retracted position, respectively designated in terms of inches of extension from the fully retracted position, respectively designated as 20 inches, 10 inches, 5 inches and 0 inches. However, as previously mentioned in connection with the circuit of FIG. 9, the fully retracted position in terms of selective extension and retraction may as a matter of fact, represent a minimum intermediate position whereby the bumper, when in its mechanically fully retracted position still is capable of additional retraction under impact loads to thereby provide a degree of shock absorbing action at fully retracted position.

In addition, the circuit of FIG. 14 is provided with push buttons by means of which any position may be selected when the vehicle is standing still, i.e., in park or neutral whereby, for example, the bumper may be fully extended if the vehicle happens to be parked in a particularly dangerous location, i.e., at the side of a high speed expressway, etc., and it is desired to provide maximum protection against impacts.

The circuit of FIG. 14 also provides the additional features that the push button selection may be made only with the gear shift in neutral (N) or park (P) positions, and if placed in a drive or reverse gear the push button selection will be cancelled and the system will revert to automatic operation.

For convenience the various switches will be labelled in accordance with funciton, speed responsive switches with the prefix S, retraction limit switches with the prefix R, extension limit switches with the prefix E and push button switches with the prefix B, followed by the extension or retraction distance, i.e., 20, 10, 5, 0. Where individual switches contain more than one section, the sections will be numbered i.e., No. 1, No. 2, etc., and the contacts of each section lettered, i.e., a, b, c.

As the general circuits follow quite closely that of FIG. 9, the circuit of FIG. 14 will be described merely in terms of operation. In this connection it will be noted that FIG. 14 illustrates the circuit with the ignition switch "off" and the gear shift in "park" (P) position. Each limit switch $R_0 - R_{10}$ and $E_5 - E_{20}$ are double-pole, single throw switches, one section of each switch being associated with a corresponding signal lamp, $L_{20}$, $L_{10}$, $L_5$, and $L_0$, which will be eliminated when the bumper structure is in the corresponding position of extension or retraction. The operative limit section of each switch will be designated, (i.e.) $E_5$, $R_{10}$, etc., while each lamp section will merely be described in connection with the associated lamp.

FULL RETRACTION POSITION

With the ignition switch off and the gear shift lever in either park or neutral position, (FIG. 14 illustrating conditions when the gear shift lever is in park) the following circuit is completed from ground (Gr) to R over limit switch $R_0$:

Gr; $B_0$ No. 4 ab; $S_{20}$ ab; $S_{10}$ ab; $B_0$ No. 2 ab; $R_0$
$B_0$ No. 3 ab; Ign No. 3 ab; P No. 1; R.     (1)

If the bumper is in extended position when the ignition switch is turned "off", switch $R_0$ will be closed to effect a retraction of the bumper until switch $R_0$ is opened thereby. As previously mentioned this position while labelled O may represent a partial extension to provide a limited degree of shock absorbing action in the bumper structure.

IGNITION ON

With the gear shift lever in park or neutral (which it normally must be before the engine can be started) upon actuating the ignition switch Ign, contacts ab of both sections 1 and 3 thereof are opened and contacts ac of section 2 are closed, thereby completing a circuit from ground to E over limit switch $E_5$ as follows:

Gr; $B_0$ No. 4, ab; $S_{20}$, ab; $S_{10}$ ab; Ign No. 2 ac;
$B_5$ No. 3 ab; $E_5$; E.     (2)

The bumper thus will be extended until limit switch $E_5$ opens. Limit switch $R_5$ is likewise open and with both switches $E_5$ and $R_5$ being opened the associated lamp contacts will be closed to operate the lamp $L_5$ signifying that the bumper is correspondingly extended.

FURTHER EXTENSION AT VEHICLE SPEEL ABOVE 10 M.P.H.

With the gear shift lever in one of the drive positions, and the vehicle speed exceeding a predetermined value, for example, 10 m.p.h., contacts ab of switch $S_{10}$ will open and contacts ac thereof close completing a circuit from ground to E over limit switch $E_{10}$ as follows:

Gr; $B_0$ No. 4 ab; $S_{20}$ ab; $S_{10}$ ac; $B_{10}$ No. 1 ab; $E_{10}$; (6)

Thus the bumper will be extended until limit switch $E_{10}$ opens. Under such conditions as operative switches $R_{10}$ and $E_{10}$ are open, the corresponding lamp switches associated therewith will be closed to illuminate the lamp $L_{10}$.

FULLY EXTENDED POSITION AT SPEEDS OVER 20 M.P.H.

If the vehicle speed is now increased to over 20 m.p.h. a circuit will be completed from ground to E over limit switch $E_{20}$ as follows:

$$Gr; B_0 \text{ No. } 4 \text{ } ab; S_{20} \text{ } ac; E_{20}; E \qquad (4)$$

The bumper will thus be extended until limit switch $E_{20}$ opens at which time the lamp switch associated therewith will be closed to illuminate lamp $L_{20}$. At the same time as limit switch $R_{10}$ has now closed, the lamp circuit to lamp $L_{10}$ is opened.

RETRACTION TO SECOND INTERMEDIATE POSITION

FIG. 14 illustrates in full line the circuitry for retracting the bumper structure to the second intermediate position, i.e., 10 inches when the speed falls below 10 m.p.h.

In this event a circuit from ground to R is completed over limit switch $R_{10}$ as follows:

$$Gr; B_0 \text{ No. } 4 \text{ } ab; S_{20} \text{ } ab; S_{10} \text{ } ab; B_{10} \text{ No. } 3 \text{ } ab; R_{10}; R. \qquad (5)$$

Thus upon the speed dropping below 10 m.p.h. in corresponding actuation of $S_{10}$ as the bumper will be retracted until limit switch $R_{10}$ opens, at which time the lamp switches associated with both switches $R_{10}$ and $E_{10}$ are closed to illuminate the lamp $L_{10}$.

If it is desired to effect such retraction at speeds below 20 m.p.h. instead of 10 m.p.h., this result can be achieved by a very minor change in the circuitry, illustrated in dotted lines in FIG. 14. In this event the connection of contact $B_{10}$ No. 3a to contact a of $S_{10}$ is broken, and instead contact $B_{10}$ No. 3a is connected to contact a of switch $S_{20}$. The general circuitry during operation, is identical with that just described with the exception that the circuit is closed when contacts ab of $S_{20}$ close, instead of at the lower speed when contact ab of $S_{10}$ close.

RETRACTION FOR PARKING

In the event the vehicle is to be parked, and it is desired that the bumper be automatically retracted to its first intermediate position, the retraction may be effected by actuation of the gear shift lever, for example, passing through neutral (N) to shift into reverse, or if neutral is not disposed between drive and reverse, the appropriate switch may be associated with the "reverse" position of the gear shift lever. In FIG. 14 it is assumed that the appropriate contacts are associated with the neutral position.

Thus upon passing the gear shift lever through neutral, contacts No. 4 of the neutral switch N will be closed, thereby energizing winding $89w$ over a circuit as follows:

$$Gr; B_0 \text{ No. } 4 \text{ } ab; S_{20} \text{ } ab; S_{10} \text{ } ab; B_0 \text{ No. } 2ab; R_0;$$
$$B_5 \text{ No. } 1 \text{ } ab; R_5; B_5 \text{ No. } 4 \text{ } ab; 91a; R. \qquad (6)$$

Winding $89w$ is locked in over contact $91b$ unit limit switch $R_5$ opens. Lamp $L_5$ will again be illuminated upon the opening of both switches $R_5$ and $E_5$.

PUSH BUTTON OPERATION

By actuation by any one of the switches $B_{20}$, $B_{10}$, $B_5$, or $B_0$, the bumper structure may be extended or retracted to a corresponding position, provided that the gear shift lever is in either neutral (N) or park (P) position. One condition in which it may be desired to have the bumper fully extended even though the vehicle is in a stationary position, is when the vehicle may be parked at the side of a high speed express highway when maximum shock absorbing protection is desired.

Thus assuming that the gear shift lever is in park or neutral position and the push button $B_{20}$ is actuated a circuit will be completed from ground to E over limit switch $E_{20}$ as follows (gear shift in P):

$$Gr; P \text{ No. } 2; B_0 \text{ No. } 1 \text{ } ab; B_5 \text{ No. } 2 \text{ } ab; B_{10} \text{ No. } 2 \text{ } ab;$$
$$B_{20} \text{ No. } 1 \text{ } ac; E_{20}; E. \qquad (7)$$

The bumper will thus be extended until switch $E_{20}$ opens, at which time the lamp $L_{20}$ will be illuminated.

Actuation of any push button switch will also actuate the contact of switch Re whereby contacts ac thereof will be closed, placing ground on one side of a solenoid winding $S_{Re}$, the opposite side of which is operatively connected to the switches No. 3 of both the neutral and park switches N and P, which contacts are normally open when the gear shift lever is in the associated position. However, if the gear shift lever should be moved out of both neutral and park position the winding $S_{Re}$ will be energized to release the actuated push button, whereupon the system will revert to its position associated with the condition then existing. Likewise, in the event the ignition switch is turned "off," contacts ab of No. 1 thereof will close to effect energization of the release solenoid and the release of any actuated push button.

In like manner, actuation of push button $B_{10}$ will result in extension to the second intermediate position over limit switch $E_{10}$ with the ground circuit corresponding to that described with respect to the actuation of button $B_{20}$. A like condition would take place when the push button $B_5$ is actuated.

In the event the botton O is actuated, the bumper will be retracted to its fully retracted position.

In the event the ignition switch is turned off while a push button is actuated, the release solenoid winding $S_{Re}$ will be energized over contacts ac of the switch Re and contacts ab of No. 1 of the ignition switch whereby the same circuit will exist as previously described when the ignition switch is turned "off."

It will be appreciated that FIG. 14 is intended to illustrate some of the possible combinations of actuation readily achievable in the present invention, and additional variation may be achieved by minor changes in the circuitry as will be apparent to anyone skilled in the art. For example, it may be desired to have the push button actuate the bumper structure to a selected position irrespective of the movement of the vehicle etc. This could readily be accomplished by eliminating appropriate connections to the gear shift switches and instead making a direct connection to the circuit point involved. Likewise, by appropriate connections to corresponding contacts or circuit points, actuation of various push buttons may be limited to a condition in which the gear shift lever is not in either neutral or park position.

As either push buttons $B_{10}$ or $B_5$ may be subsequently actuated with the push button $B_{20}$ or the push button $B_0$ already actuated, actuation of either push button $B_{10}$ or $B_5$ will ready circuits to both R and E in dependence upon the condition of the associated limit switches.

Thus if the push button $B_{20}$ were actuated and the button $B_{10}$ or $B_5$ subsequently actuated the bumper structure would retract to the selected position, and upon actuation of one of the buttons $B_{10}$ or $B_5$, subsequent to the actuation of the button $B_0$, the bumper would be accordingly extended. To provide an indication that a push button is actuated, a suitable lamp may be associated therewith, for example, adapted to illuminate the actuated push button. Such lamps are generally designated by the reference letter L and are operatively connected to one or more contacts c of the associated push button switch.

As previously mentioned the circuit of FIG. 14 includes a plurality of extended positions and various types of operation including push button operation, and it is quite possible that particular systems will preferably employ circuitry corresponding to only some of the features of FIG. 14 sufficient to fulfill the particular function desired. It should therefore be kept in mind that the specific combination of features illustrated in FIG. 14 are only illustrative and thus need not be employed in combination with all of the other features illustrated.

Having thus described our invention it is obvious that although minor modifications might be suggested by those versed in the art, it should be understood that we wish to embody within the scope of the patent warranted hereon all such modifications as reasonably and properly come within the scope of our contribution to the art.

We claim as our invention

1. A bumper structure, particularly for vehicles, comprising a bumper member adapted to receive impact loads applied thereto in a predetermined direction over a predetermined travel from a maximum extended position to a maximum retracted position, means for supporting said bumper member in operative position to receive such loads, including a plurality of elongated unitary members each of which, when extended in a straight line, is independently rigid under compression forces acting along such line, but capable of flexing in a direction transverse to such line, each such elongated member being operatively connected at one end to the bumper structure for receiving such impact loads and transmitting them along respective straight lines, each such member, when the bumper member is in extended position, spanning at least a portion of the distance between said extended and retracted position, means disposed adjacent the retracted position of said bumper member for guiding the opposite ends of said elongated members into transverse directions as the elongated members retract under compression forces resulting from such impact loads on the bumper member, with said opposite ends spaced rearwardly from the retracted position of the bumper member a distance less than that between said extended and retracted positions, and shock absorbing means operatively connected to said elongated members, whereby compression forces thereon are transmitted to said shock absorbing means.

2. A bumper structure according to claim 1, wherein said shock absorbing means is operatively connected to portions of said elongated members extending transversely to the direction of such impact loads.

3. A bumper structure according to claim 1, wherein said shock absorbing means is operatively connected to said guiding means whereby impact loads are successively transmitted from said elongated members to said guiding means and from the latter to said shock absorbing means.

4. A bumper structure according to claim 1, wherein said shock absorbing means comprises at least two relatively movable elements operatively connected by a fluid, with the shock absorbing action being derived by control of the action of such fluid in the presence of compression forces thereon by the transmission of impact loads thereto, acting on said elements.

5. A bumper structure according to claim 4, wherein said movable element is constructed for rotary movement.

6. A bumper structure according to claim 5, wherein said movable element is the rotor of a positive displacement pump.

7. A bumper structure according to claim 4, wherein one of said relatively movable elements is stationary with respect to the direction of said compression forces and the other of such elements is constructed to receive said compression forces to effect movement of such member relative to the stationary member.

8. A bumper structure according to claim 4, wherein said elongated members are arranged to transmit impact loads on said bumper member and apply the same, as oppositely directed compression forces, on said elements, and means for supporting said shock absorbing means for movement of both of said elements under said compression forces.

9. A bumper structure according to claim 4, wherein said movable element is constructed for reciprocable movement.

10. A bumper structure according to claim 9, wherein said shock absorbing means comprises at least one hydraulic cylinder having a piston movable therein, said cylinder being filled with a liquid to which said compression forces are applied, and means operatively connected to the cylinder interior for controlling the flow of liquid therefrom.

11. A bumper structure according to claim 10, wherein said liquid controlling means forms an integral part of the shock absorbing means and is responsive to and controlled by relative movement between said piston and cylinder.

12. A bumper structure according to claim 4, wherein said liquid controlling means comprises an adjustable valve structure having a movable adjusting member, and means operatively transmitting movement of an elongated member, under impact loads, to said adjusting member, operative to vary the shock absorbing characteristics of said shock absorbing means during operation of the latter.

13. A bumper structure according to claim 12, wherein said valve means is operatively connected to and adapted to be actuated by said guiding means for the elongated members.

14. A bumper structure according to claim 1, wherein said elongated members include at least one which extends diagonally with respect to the direction of impact loads on the bumper member.

15. A bumper structure according to claim 14, wherein at least two of said diagonally extending elongated members are utilized, extending respectively in opposite diagonal directions.

16. A bumper structure according to claim 1, wherein each of said elongated members is formed at least in part by a respective chain, each of which comprises a plurality of roller links having respective side plates at each longitudinal edge thereof, constructed to render the chain, when extended in a straight line, rigid under compression forces in such line, each such chain being operatively connected at one end, to said bumper member, said means for guiding said chain members into directions tranverse to the compression forces thereon, as the chains are retracted, comprising respective sprockets engaged with the associated chain.

17. A bumper structure according to claim 16, wherein said shock absorbing means comprises at least one positive displacement rotary pump, the rotor of which is operatively connected to at least one of said chain structures for effecting rotation of said rotor, and means for controlling the operation of said pump to control the shock absorbing means characteristics thereof.

18. A bumper structure according to claim 16, wherein at least four chains are employed, arranged in pairs, each pair being guided by respective sprockets arranged on a common axis, the portion of one chain of each pair extending from its cooperable sprocket to the bumper member in a line normal to the plane of the latter, the portions of the other chain of each pair extending diagonally from it cooperable sprocket in a direction generally toward the connection of the first chain of the other pair to the bumper member, the sprockets of a pair being freely rotatable relative to each other, and the sprockets of the first chains of each pair being operatively connected to rotate together in opposite directions, and the sprockets of the other chains being operatively connected to rotate together in opposite directions.

19. A bumper structure according to claim 16, wherein the connection of at least one chain of each pair, to the bumper member comprises mounting means adapted to be rigidly secured to the bumper member, said mounting means being rigidly secured to at least two roller links of said chain, whereby such connection will tend to restrict buckling of the chain in the presence of compression forces thereon.

20. a bumper structure according to claim 16, wherein the connection of at least one chain of each pair, to the bumper member comprises mounting means adapted to be rigidly secured to the bumper member, a member rigidly secured to at least two roller links of said chain, means pivotally connecting sid member to said mounting means, and resilient means for urging said member in a pivotal direction operative to exert forces on said chain opposing buckling forces thereon.

21. A bumper structure according to claim 16, wherein the connection, of at least one chain of each pair, to the bumper member comprises mounting means adapted to be rigidly secured to the bumper member, and means pivotally connecting the end of said chain to said mounting means, the pivotal axis of such connection extending parallel to the axis of said rollers, and laterally spaced from a straight line connecting said roller axes, at the side of such line adjacent said abutting edges of said side plates, whereby compression forces on said chain tend to oppose buckling forces therein.

22. A bumper structure according to claim 16, comprising in further combination, means engageable with each respective chain adjacent the sprocket therefor for restricting separating movement of the chain in a radial sprocket-disengaging direction.

23. A bumper structure according to claim 22, wherein said restricting means is disposed to receive compression loads on the associated chain and direct the same in a direction transverse to the original direction thereof.

24. A bumper structure according to claim 16, comprising in further combination, means engageable with said chain adjacent the sprocket therefor, disposed to receive compression loads on the associated chain and direct the same in a direction transverse to the orignial direction thereof.

25. A bumper structure, particularly for vehicles, comprising a bumper member adapted to receive impact loads applied thereto in a predetermined direction, means for supporting said bumper member in operative position to receive such loads, including a plurality of elongated members each of which, when extended in a straight line, is rigid under compression forces acting along such line, but capable of flexing in a direction transverse to such line, each of said elongated members is formed at least in part by a respective chain, each of which comprises a plurality of roller links having respective side plates at each longitudinal edge thereof, constructed to render the chain, when extended in a straight line, rigid under compression forces in such line, each such chain being operatively connected at one end, to said bumper member, for receiving such impact loads and transmitting them along respective straight lines, means for guiding said chain members into directions transverse to the compression forces thereon, as the chains are retracted, resulting from such impact loads on the bumper member, comprising respective sprockets engaged with the associated chain, at least four such chains being employed, arranged in pairs with a pair being disposed adjacent each end of the bumper member and the chains of each pair disposed one above the other, a sprocket for each such chain with the sprockets for the chains of a pair being disposed on a common axis extending at right angles to the normal direction of impact loads on said bumper member, and means operatively connecting the sprockets of one pair with the sprockets of the other pair whereby all of said chains, simultaneously move equally and said bumper member throughout its normal movement lies in planes extending at right angles to said normal direction of impact loads, and shock absorbing means operatively connected to said chains, whereby compression forces thereon are transmitted to said shock absorbing means.

26. A bumper structure according to claim 25, wherein one chain of each pair is operatively connected at its inner end directly to said shock absorber means, and stationary guide means engageable with the inner end of the other chain of such pair for guiding the end portion thereof during movement of said chains.

27. A bumper structure according to claim 25, wherein the chains of a pair are connected at spaced points along their length, operative to retain said chains in predetermined spaced relation throughout their length.

28. A bumper structure according to claim 27, wherein in each chain includes at least two spaced sets of side plates, between which sprocket-engaging rollers extend, said rollers being supported on respective pins extending between cooperable sets of side plates, the pins of one chain of a pair being axially aligned with corresponding pins of the other chain of a pair, at least some of such pins extending between the chains of a pair and being common to a roller at each chain thereof.

29. A bumper structure according to claim 25, wherein one chain of each pair is operatively connected at its inner end directly to said shock absorbing means, and resilient means operatively connected to the inner end of the other chain of such pair urging the same in retracting direction.

30. A bumper structure according to claim 25, wherein one chain of each pair is operatively connected at its inner end directly to said shock absorber means, resilient means connected to the inner end of the other chain of such pair urging the same in retracting direction, and means for guiding the inner end of such other chain during movement thereof.

31. A bumper structure according to claim 1, wherein certain of said elongated members are movable under impact loads on said bumper member in a predetermined relationship, and other of said elongated members are similarly movable in a different predetermined relationship, means operatively connecting elongated members movable in the one predetermined relationship for maintaining such relationship therebetween, and means operatively connecting elongated members movable in the other predetermined relationship for maintaining such relationship therebetween.

32. A bumper structure according to claim 1, wherein said elongated members are arranged in pairs adjacent each end of the bumper member, and means connecting the elongated members of each pair to maintain the members of a pair in predetermined spaced relation.

33. A bumper structure, particularly for vehicles, comprising a bumper member adapted to receive impact loads applied thereto in a predetermined direction over a predetermined travel from a maximum extended position to a minimum retracted position, means for supporting said bumper member in operative position to receive such loads, including a plurality of elongated unitary members, each of which is rigid under compression forces acting in said predetermined direction, each such elongated member being operatively connected at one end to the bumper structure for receiving such impact loads and transmitting them along respective straight lines, each such member, when the bumper is in extended position, spanning at least a portion of the distance between said extended and retracted positions, means disposed rearwardly of the retracted position of said bumper member operatively connecting said elongated members for transmitting retracting movement of one member to the other member in the same direction, whereby both elongated members equally retract under compression forces resulting from such impact loads on the bumper member, and shock absorbing means operatively connected to said elongated members, whereby compression forces thereon are transmitted to said shock absorbing means.

* * * * *